United States Patent Office 3,171,273
Patented Mar. 2, 1965

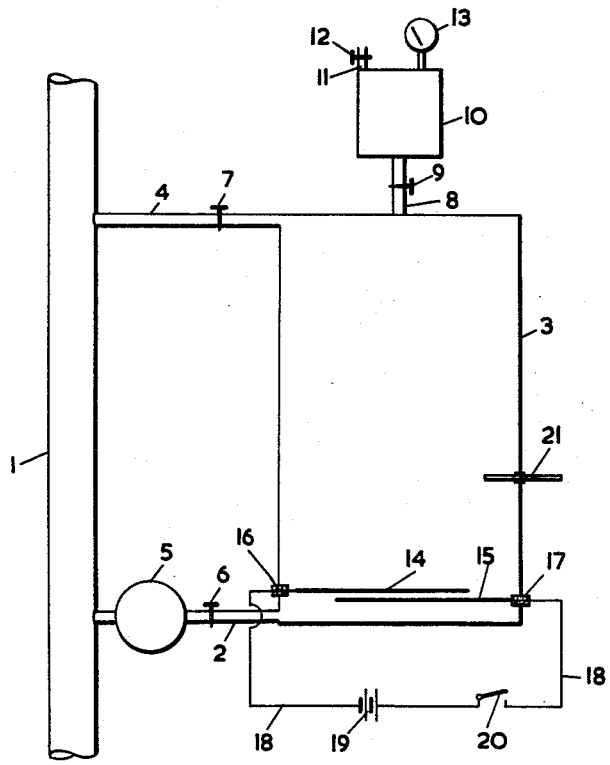

3,171,273
METHOD OF ESTABLISHING THE GAS EQUILIBRIUM PRESSURE IN AN AQUEOUS LIQUID
Leendert Frederik Willem Dijkema, Rotterdam, Netherlands, assignor to Heineken's Brouwerijen Nederland N.V., Amsterdam, Netherlands, a corporation of the Netherlands
Filed Sept. 11, 1961, Ser. No. 137,156
Claims priority, application Netherlands, July 31, 1961, 267,744
2 Claims. (Cl. 73—19)

It is known that if there is equilibrium between the gas dissolved in a liquid contained in a vessel and the gas contained in a gas space above the liquid in said vessel the pressure in said gas space and the temperature of the liquid are a measure of the gas content of said liquid. For simplicity's sake reference will always be made to carbon dioxide gas hereinafter, though it will be clear that the method and the apparatus described may be applied to and operated with other gases as well. If it is desired to carry out the determination meant above one should naturally be sure that the state of carbon dioxide equilibrium as meant above has been reached. It is well known that various gases can be dissolved in a liquid in such an amount as to supersaturate the liquid, such, for example, as carbon dioxide in water. The problem, therefore, presents itself to reach said state of gas equilibrium in a rapid and simple manner.

According to a known method the excess of dissolved gas is liberated by means of a vibrator submerged in the supersaturated liquid. Such a vibrator, however, is a rather sensitive member, which, moreover, must be kept energized for a certain time if the supersaturation of the liquid is actually to be terminated and the gas equilibrium is to be reached. The success of the operation, therefore, depends on the carefulness of the operator.

The object of the invention is to provide a very simple method for establishing the gas equilibrium pressure. On the basis of this method the invention also relates to a method for determining the amount of gas dissolved in an aqueous liquid.

The method of establishing the gas equilibrium pressure in an aqueous liquid supersaturated with a gas is so carried out according to the invention that in the liquid—and preferably in the lower portion thereof—a very slight amount of water is decomposed by means of electrolysis and the gas bubbles formed during this decomposition are allowed to rise through the liquid to the surface thereof. The method of determining the amount of gas dissolved in an aqueous liquid, in which method the temperature of the liquid and the gas equilibrium pressure are a measure of the gas content of the liquid, is characterized, according to the invention, in that the state of gas equilibrium is reached by means of the method just mentioned.

For elucidating the invention methods will be described hereinafter with reference to the accompanying drawing showing an apparatus by means of which said methods can be carried out. Let it be assumed that beer, the carbon dioxide content of which is to be determined periodically, continuously flows through a conduit 1. A supply line 2 is connected to said conduit 1, said supply line leading to a container 3. A discharge line 4 again leads back to the beer conduit 1. The supply line 2 includes a pump 5 by means of which the beer can be circulated via the container 3 either continuously or periodically, so that each time the container 3 contains another sample of beer from conduit 1. In the lines 2 and 4 respectively, stop valves 6 and 7 respectively are included, by means of which the contents of the container 1 can be temporarily isolated in order to make said contents undergo a treatment. The container 3 communicates via a tube 8 provided with a stop valve 9, with a gas space 10. Said gas space 10 may be set into communication with the atmosphere by means of an outlet 11 provided with a cock 12, or may be shut off from the atmosphere. A pressure gauge 13 communicating with the interior of the gas space 10 renders it possible to measure the gas pressure in said gas space. In the lower portion of container 3 two electrodes 14 and 15 are provided; said electrodes 14 and 15 are mounted in insulators 16 and 17 provided in the wall of container 3. The electrodes 14 and 15 are connected by means of a lead 18 with a battery 19 via a switch 20. Operations are started with cock 9 in closed position and valves 6 and 7 in open position, the pump 5 being in operation. Container 3 therefore contains beer of the same composition as the beer flowing through conduit 1.

Let it furthermore be assumed that valve 12 is open, so that there is an atmospheric pressure in the gas space 10. Subsequently, valves 6, 7 and 12 are closed, so that a certain amount of liquid is contained in the container 3 which liquid is isolated from the beer flowing through conduit 1. At the same time cock 9 is opened, while moreover switch 20 is closed for some seconds. As a result of the electrolysis gas bubbles will form on the electrodes 14 and 15 which are immediately released and rise to the surface of the liquid. In rising through the liquid in container 3 said gas bubbles form nuclei for the carbon dioxide gas separating out of the liquid. In actual practice it will be observed that suddenly a cloud of gas bubbles forms and rises through the liquid. The gas equilibrium pressure has been established then. From the pressure read on the pressure gauge 13 and from the temperature of the liquid in container 3 read on a thermometer 21 the carbon dioxide content of the beer then present in container 3 may be determined in known manner. After closing cock 9 and opening stop valves 6 and 7 the sample is pumped out of the container 3 and replaced by fresh beer so that, if desired, a new measurement can be made. The apparatus shown in the drawing and described hereinbefore naturally is only meant as a schematic apparatus. In actual practice various operations may be effected simultaneously and automatically, respectively, such for example as the opening and closing of valves.

If direct current is used for the electrolysis a voltage of about 8 v. is generally sufficient. If desired, it is also possible to apply alternating current, in which case a voltage of 20 v. is to be preferred, provided that the number of periods is not too high.

The apparatus described is very simple and sturdy and owing to the very short time during which the switch is to be closed for the electrolysis it is nearly impossible to operate it wrong. Because there are no moving parts, this in contradistinction to the known apparatus in which a vibrator is used, maintenance is rarely necessary.

I claim:
1. A method of establishing the gas equilibrium pressure in a body of an aqueous liquid supersaturated with a gas in a container, which comprises decomposing a very slight amount of the water in the lower portion of said body of said aqueous liquid supersaturated with said gas by means of electrolysis, and allowing the gas bubbles formed during the decomposition to rise through the body of said liquid to the surface thereof, whereby said gas bubbles form nuclei for the gas separating out of the liquid.
2. A method of determining the amount of gas dis- solved in an aqueous liquid supersaturated with said gas in which the temperature of the liquid and the gas equilibrium pressure are a measure of the gas content of said liquid which comprises confining said liquid in a container provided with a gas space, decomposing a very slight amount of the water in the lower portion of said body of said aqueous liquid supersaturated with said gas by means of electrolysis, allowing the gas bubbles formed during the decomposition to rise through the body of said liquid to the surface thereof, measuring the temperature of said liquid and measuring the pressure of said gas space.

References Cited by the Examiner

UNITED STATES PATENTS

| | | | |
|---|---|---|---|
| 308,276 | 11/84 | Paine | 204—129 X |
| 1,581,944 | 4/26 | Hausmeister | 204—129 |

RICHARD C. QUEISSER, *Primary Examiner.*

ROBERT L. EVANS, *Examiner.*